Oct. 11, 1966  T. R. MILES  3,277,937
PANEL SCARIFYING APPARATUS
Filed Dec. 9, 1963  4 Sheets-Sheet 1

THOMAS R. MILES
INVENTOR.
BY
BUCKHORN, BLORE, KLARQUIST & SPARKMAN
ATTORNEYS

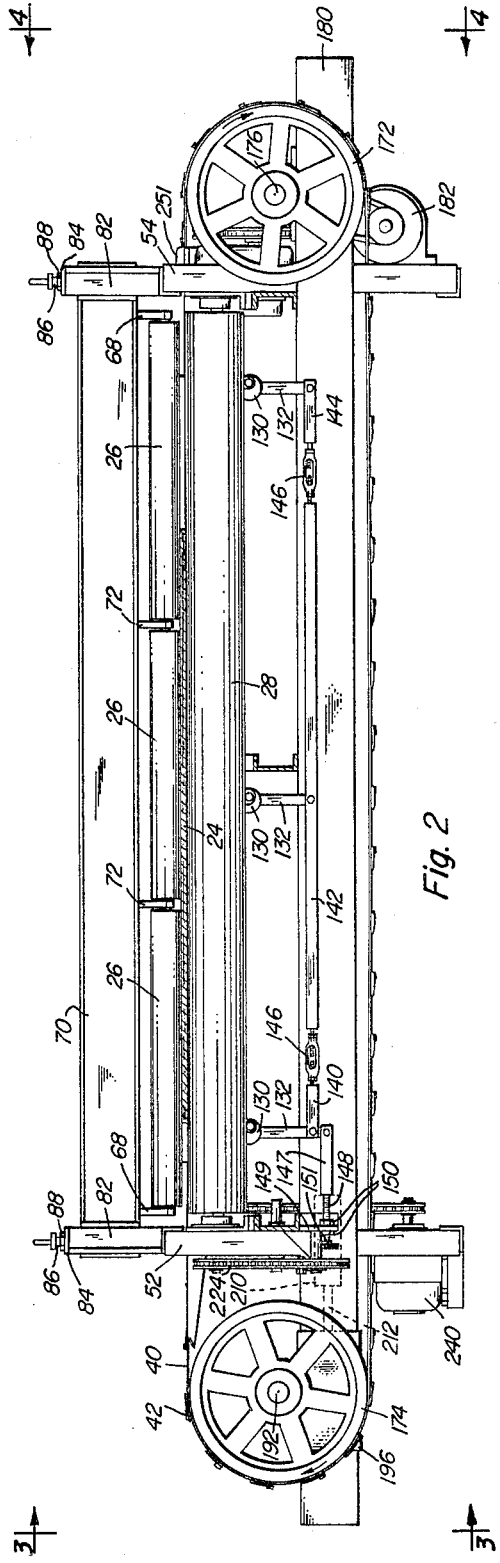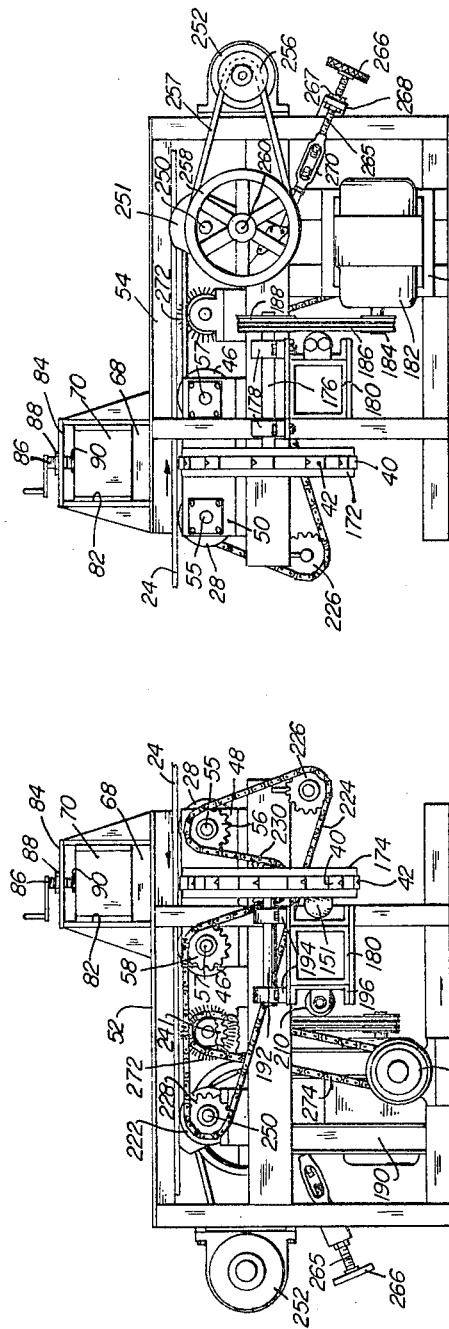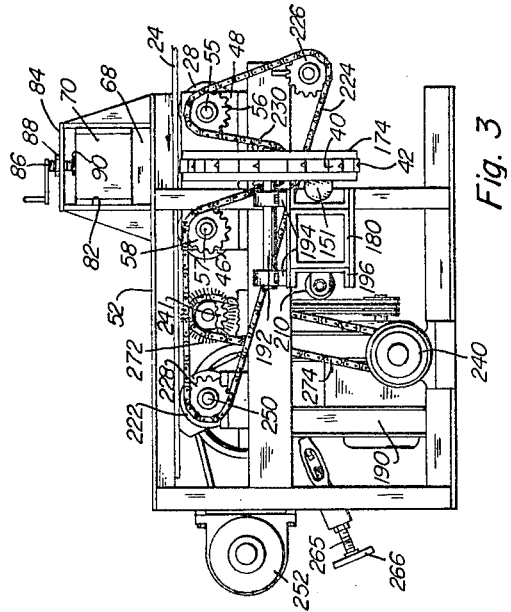

Oct. 11, 1966  T. R. MILES  3,277,937
PANEL SCARIFYING APPARATUS
Filed Dec. 9, 1963
4 Sheets-Sheet 3

THOMAS R. MILES
INVENTOR.
BY
BUCKHORN, BLORE, KLARQUIST & SPARKMAN
ATTORNEYS

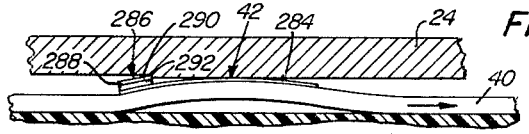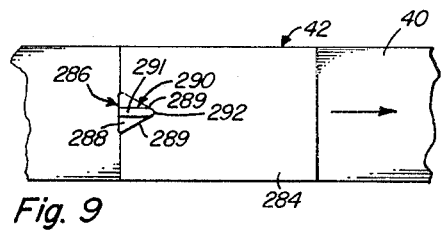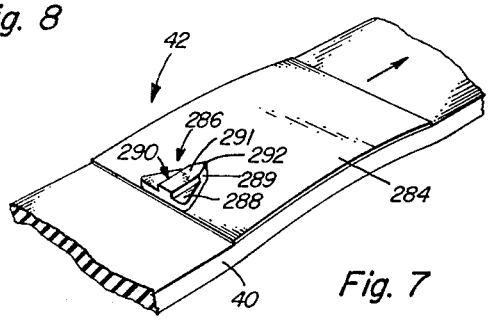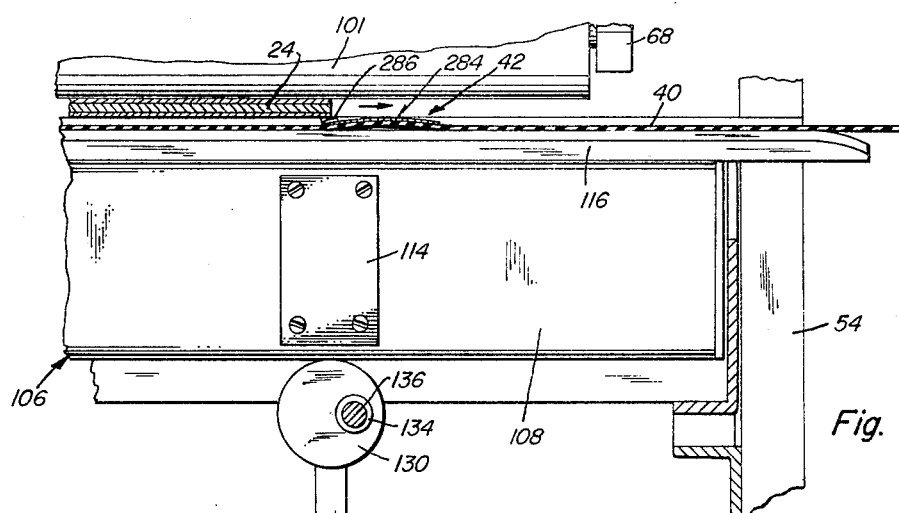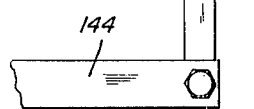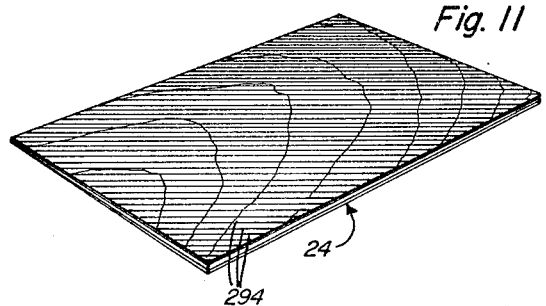

United States Patent Office 3,277,937
Patented Oct. 11, 1966

3,277,937
PANEL SCARIFYING APPARATUS
Thomas R. Miles, 5475 SW. Arrow Wood Lane,
Portland, Oreg.
Filed Dec. 9, 1963, Ser. No. 328,840
9 Claims. (Cl. 144—115)

This invention relates to a scarifying apparatus, and more particularly to an apparatus for scarifying a face of a structural or decorative panel such as, for example, a plywood panel.

The apparatus of the invention is designed to provide an architecturally desirable surface to a structural panel. Contemporary architectural requirements frequently call for exterior or interior wall surfaces provided with a texture similar to that present on "re-sawn" lumber. Plywood and other panels have many desirable characteristics making them otherwise desirable for surfacing of walls in place of re-sawn lumber and it is a principal object of the present invention to provide apparatus capable of producing on the surface of such panels an aesthetically pleasing texture of the nature of a re-sawn surface, but unique and unlike the texture produced by apparatus heretofore available.

Another object of the invention is to provide a texture producing panel scarifying apparatus capable of easy adjustment to vary the texture produced on the surface of the panel.

Still another object is to provide an improved scarifying apparatus with which panels may be scarified at low cost.

Yet another object of the invention is to provide a scarifying apparatus having a belt provided with scarifying cutters thereon.

A further object of the invention is to provide a new and novel cutter design for a scarifying apparatus.

Other objects and advantages will become more apparent hereinafter.

The illustrated embodiment of the invention comprises apparatus for feeding a panel flatwise in a horizontal plane in a given direction and over a belt driven to move transversely at right angles to such direction. The belt is provided with a plurality of cutters which engage the under surface of the panel to remove material therefrom and form shallow grooves in such face. Means are provided for varying the speed of advancement of the panel and the belt so as to vary the groove pattern. Means are also provided to control the depth of the grooves cut in the panel.

Further details of the invention will be described with reference to the embodiment illustrated in the attached drawings wherein:

FIG. 2 is an enlarged side elevational view taken substantially along line 2—2 of FIG. 1 with infed conveying apparatus removed;

FIG. 3 is a fragmentary end elevation looking in the direction of the arrows 3—3 of FIG. 2;

FIG. 4 is a fragmentary end elevation looking in the direction of the arrows 4—4 of FIG. 2;

FIG. 6 is a fragmentary view, partly in section, taken substantially along line 6—6 of FIG. 5;

FIG. 7 is an enlarged, fragmentary, perspective view of the cutting tool and belt for carrying the same;

FIG. 8 is an enlarged, fragmentary, side elevation of the cutting tool and a portion of the belt;

FIG. 9 is an enlarged, fragmentary, top elevation of the cutting tool and belt;

FIG. 10 is an enlarged, fragmentary view of a modified bit shape; and

FIG. 11 is a perspective view of a panel scarified in the apparatus of the present invention.

Figure 1:
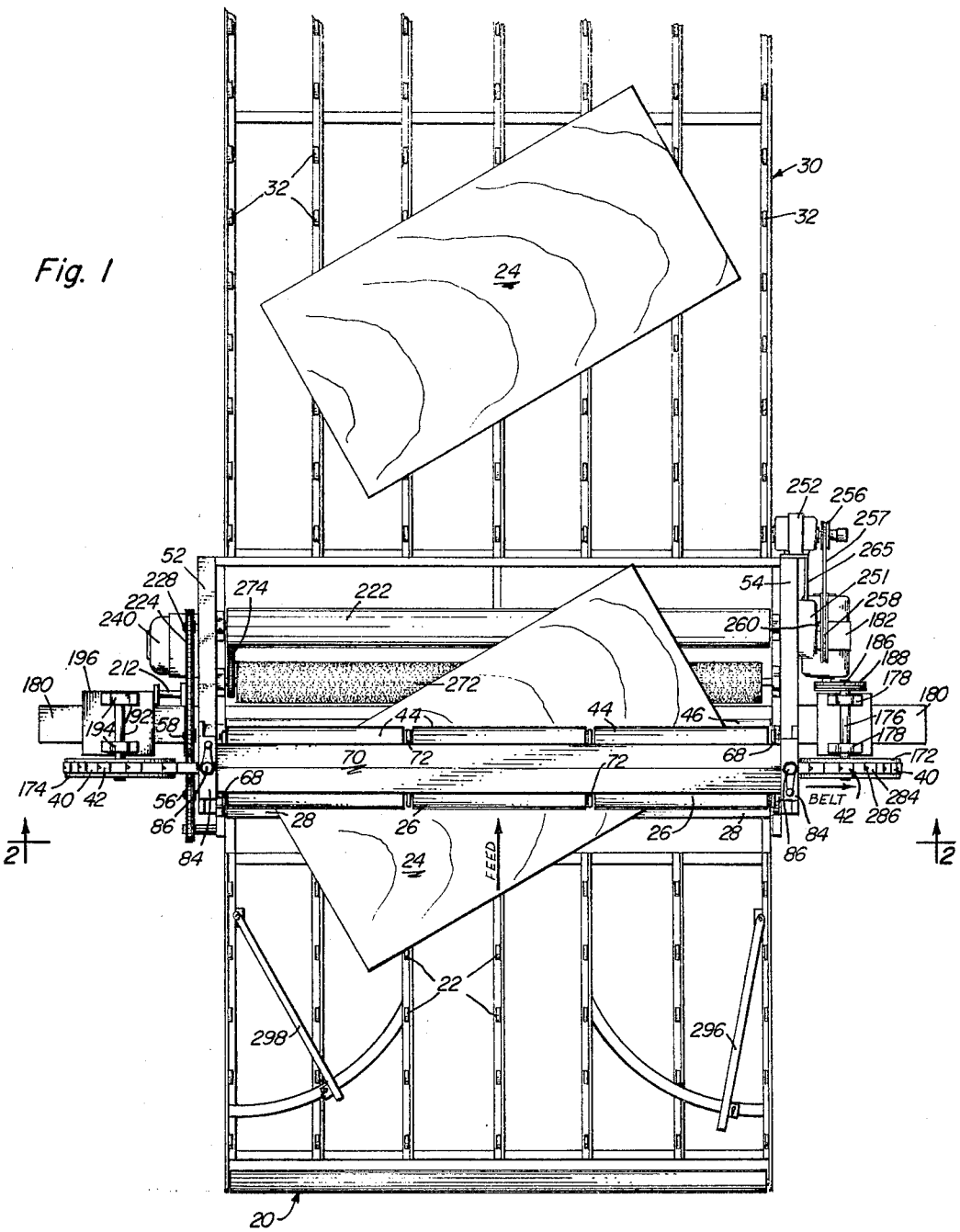
FIG. 1 is the top plan view of an apparatus made in accordance with the present invention.

Referring first to FIG. 1, in accordance with the apparatus of the invention means are provided for feeding panels 24 flatwise along a horizontal plane, such means including an infeed conveyor table 20 onto which panels to be scarified may be fed manually or automatically, the table comprising a plurality of rollers 22 upon which each panel may be pushed into the grip of a feed roll asembly comprising upper infeed rolls 26 and lower infeed roll 28. After scarifying, the panels 24 are fed onto an offbearing conveyor 30 which may be of any suitable construction, but is shown herein as comprising rollers 32 supported in suitable framing structure. Other arrangements may be used for feeding panels into the infeed rolls 26, 28. For example, a stack of panels may be positioned upon an elevating structure in front of the feed rolls 26, 28 and the top panel of the stack fed manually or automatically into the nip of the infeed rolls, the stack being raised as necessary to maintain alignment of the top of the stack with the rolls.

Figure 5:
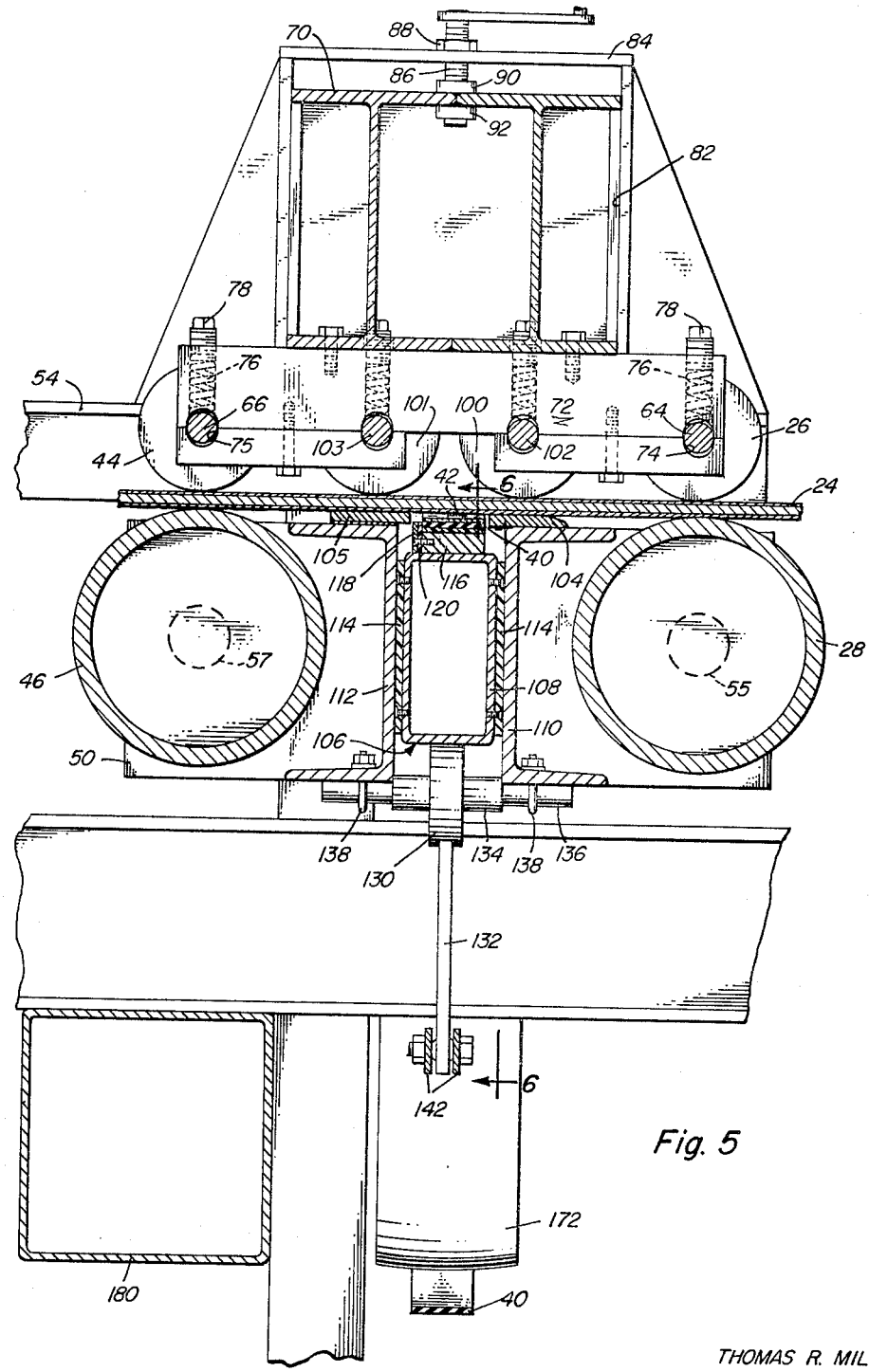
FIG. 5 is an enlarged sectional view of a fragmentary portion of the apparatus to show certain details thereof.

In accordance with the invention, referring now more particularly to FIG. 5, the panels 24 are fed by the infeed rolls 26 and 28 over a belt 40 mounted in a manner to be described so as to move transversely of the direction of movement of the panels and upon which belt a plurality of cutter elements 42 are mounted to engage and remove a portion of the lower surface of the panel. From the belt 40 the panels are fed between a pair of outfeed rolls 44 and 46 and thence onto the offbearing conveyor 30. The rolls 28 and 46 are supported in suitable bearings mounted on end plates 48 and 50 suitably supported in end frames 52 and 54 shown in FIGS. 3 and 4 respectively. The rolls 28 and 46 include supporting shafts 55, 57 which extend outwardly of the plate 48 and have fixed thereto sprockets 56 and 58, respectively, for driving the rolls by means to be described in more detail hereinafter.

The top rolls 26 and 44 (FIGS. 1 and 5) are preferably segmented and, in the illustrated embodiment, each comprises three individual roll sections which are rotatably journaled on shafts 64 and 66. The ends of the shafts 64 and 66 are supported in mounting blocks 68 bolted to a hold down beam 70 which extends transversely of the machine and which is mounted so that it may be raised and lowered relative to the rolls 28 and 46 to adjust for feeding panels of different thicknesses. Mounting blocks 72 similar to the blocks 68 are provided intermediate the roll sections. The mounting blocks 68 and 72 are split and are provided with vertically extending slots 74, 75 in which the shafts 64, 66 are movable vertically. Compression springs 76 seated on the shafts 64, 66 and against threaded plug members 78 adjustably threaded in the blocks 68, 72 urge the shafts 64, 66 downwardly. The hold down beam 70 is mounted to slide vertically between guides 82 fixed to the end frames 52, 54. A plate 84 extends between each pair of guides over the top of the beam 70 and a screw 86 extends downwardly through each plate and through a nut 88 fixed to the plate. The lower ends of the screws are secured by thrust collars 90, 92 to the upper flange of the beam 70 whereby rotation of the adjustment screws 86 will lower or raise the beam 70, as desired by the operator of the apparatus, to adjust for panels of various thickness.

Intermediate the upper infeed rolls 26 and upper outfeed rolls 44 are hold down rolls 100, 101 each comprising three sections mounted on shafts 102, 103, respectively. Such shafts are spring mounted in the mounting blocks 68, 72 in a manner similar to the mounting of shafts 64, 66. The hold down rolls 100, 101 are positioned over gauge plates 104, 105 respectively, extending across the apparatus along opposite sides of the belt 40. The top surface of the plate 104 on the infeed side of the belt lies in a plane tangential to the lower infeed roll 28. The top surface of the plate 105 is, on the other hand, positioned slightly above such plane for a purpose to be explained. The upper course of the belt 40 is supported by a vertically adjustable supporting bar assembly 106, which includes a tubular bar 108 of generally rectangular cross section which is movable vertically between a pair of channels 110 and 112 connected rigidly to the end frames 52 and 54 and forming a guideway for the bar 108. The bar 108 carries plates 114 of a suitable low friction material, such as, for example, a dense phenolic composition impregnated with graphite, fastened to the sides thereof and bearing against the faces of the channels 110 and 112 to facilitate raising and lowering thereof. A runway for the belt 40 is formed on the top of the bar 108 by a horizontal supporting plate 116 rigidly fixed to the top of the bar and an edge guide 118 fixed to the plate 116, each of which may be provided with a suitable low friction facing 120. The edge guide 118 prevents movement of the belt 40 to the left, as viewed in FIG. 5, and insures that the upper course of the belt 40 travels along a straight line.

As best illustrated in FIGS. 2, 5 and 6, the tubular bar 108 is supported by a plurality of eccentric cams 130 having arms 132 rigidly connected thereto and also having bearing sleeves 134 mounting the cams 130 eccentrically on axles 136 clamped to the channels 110 and 112 by U-bolt clamps 138. The arms 132 are pivotally connected at their lower ends to rigid links 140, 142 and 144 interconnected by turnbuckles 146 to form an adjustable interconnecting link assembly. As illustrated in FIG. 2, the lefthand arm 132 is connected to a link 147 into which is threaded an adjustment screw 148 which extends through a frame bracket 149. The screw 148 is held against axial movement by collars 150 and is provided with a hand wheel 151 whereby the height of the supporting bar assembly 106 may be adjusted relative to the gauge plates 104 and 105 and the feed roll hold down assembly by rotating the hand wheel.

The belt 40 (FIGS. 2, 3 and 4) courses over a crowned drive pulley 172 and a crowned idler pulley 174, the pulleys being of the same size. The pulley 172 is keyed to a shaft 176 journaled in bearings 178 fixedly mounted on a support beam 180 extending transversely of the machine. The shaft 176 is driven by an electric motor 182 through a pulley 184, belts 186, and a pulley 188 keyed to the shaft 176, the motor 182 being mounted on a base 190 fixed to the end frame 54. The pulley 174 is keyed to a shaft 192 (FIGS. 2 and 3) journaled in bearings 194 fixed to a tubular base 196 slidably mounted on the beam 180. Means are provided to bias the pulley 174 away from the pulley 172 so as to maintain uniform tension on the belt 40 and automatically take up any slack resulting from lengthening of the belt either as a result of tension thereon or thermal expansion. The illustrated means comprises a pneumatic piston and a cylinder assembly including a cylinder 210 suitably fixed to the beam 180 and supplied with air under uniform pressure from any suitable source (not shown). The piston rod 212 of such assembly is connected to the base 196 supporting the pulley 174 whereby the air pressure in the cylinder 210 continually urges the pulley 174 away from the pulley 172 and applies a uniform tensioning force to the belt 40 at all times. The belt 40 normally is driven at a rate of speed of about 5000 feet per minute.

The lower rolls 28 and 46 and outfeed roll 222 are all driven in the same direction, as illustrated in FIG. 3, by a chain 224 coursing over sprockets 56, 58, 226, 228 and 230. The chain 224 is driven by the sprocket 228, which is keyed to shaft 250 driven through a gear box 251 by an electric motor 252 (FIG. 4) mounted on the frame 54 and driving a variable pitch sheave 256 engaging a V-belt 257 to drive a fixed diameter pulley 258. The pulley 258 is keyed to a shaft 260 carried by the gear box 251 which is pivotal on the shaft 250. The pulley 258 is moved toward and away from the sheave 256 by an adjustment screw 265 carrying a knob 266 and fixed against axial movement by collars 267 positioned on opposite sides of a bracket 268 fixed to the frame 54. The screw 265 transmits thrust through a turnbuckle 270 to the lower end of gear box 262 to move the pulley 258 closer to or farther away from the sheave 256. When the pulley 258 is moved closer to the sheave 256, the effective diameter of the sheave 256 increases and the speed of rotation of the pulley 258 is increased to increase the speed of shaft 250. When the pulley 258 is moved farther from the sheave 256 the effective diameter of the sheave 256 is reduced and the speed of the pulley 258 and consequently that of shaft 250 also are reduced.

A wire brush 272 mounted between the rolls 46, 222 preferably is provided for brushing the bottom surface of the panel 24 and removing splinters and debris therefrom. The wire brush 272 is driven by a chain 274 driven by an electric motor 240 mounted on the end frame 52 and driving sprocket 241 keyed to the brush shaft.

The cutter elements 42 are secured to the outer surface of the belt 40 at points along the belt spaced substantially equidistantly from each other, about one foot apart in one constructed embodiment of the invention. The illustrated cutter elements each includes an arcuate base plate 284 preferably adhesively secured as by vulcanizing over the entire bottom face thereof to the top surface of the belt and which may be otherwise secured, as by riveting or the like, to the belt, at least at the forward end thereof, if desired. Secured integrally to the base plate 284 at the rear ends thereof, as by welding, are cutter bits 286 preferably of tungsten carbide or the like, each of which includes a body or base 288 and an integral elongated rib or blade 290 upstanding from the base portion 288. The forward end of a cutter bit 286 is defined by a pair of side faces 289 lying in planes substantially normal to the base plate and defining an acute angle with respect to each other, and being symmetrically disposed on opposite sides of the longitudinal axis of the plate. The top surface 291 of a bit is substantially parallel to a plane tangential to the base plate at the mid point of the bit body. The intersection of the faces 289 and top surface 291 defines a sharp edge 292 but preferably the intersection of the faces 289 with each other is slightly rounded. The bit shape may be varied somewhat depending upon the material of the panel being processed. The bit just described above is particularly effective for scarifying hardboard. For scarifying plywood, on the other hand, it is preferred that the rib 290′ be offset from the center line of the bit as shown in FIG. 10 so that an extremely sharp leading edge 292′ is formed on the bit. The bit may easily be resharpened by grinding back the face 289′.

The base plates 284 are curved so as to have substantially the same radius of curvature as the belt 40 as it passes around the pulleys 172, 174, so that each base plate is substantially concentric to the respective pulley over which it is passing (see FIG. 2). As is apparent from FIG. 8, the cutter bits 286 have a length substantially less than one-half of the length of the plates 284 and each has a height with respect to the chord defined by the opposite ends of a plate slightly greater than the height of the arc of the plate. The curvature of the base plates 284 has two functions. It facilitates passage of the belts 40 about the pulleys 172, 174 and, more importantly, it causes the plates to act as depth gauges to limit and control the depth of cut of the cutter bits 286. As indicated in FIG. 8, the reaction force on a cutter bit as it moves across the panel 24 causes the forward end of the plate 284 on which it is mounted to be forced upwardly and into engagement with the under surface of the panel and which engagement restricts penetration of a tooth into a panel. In the scarification of plywood, for example, it will be appreciated that plywood veneer is composed of bands of wood of varying hardness. Rotary cut Douglas fir, for example, will have bands of relatively soft "spring" wood and bands of much harder "summer" woods. Without a depth limiting means such as provided by the plate 284, it has been found that cutters will penetrate much deeper into the softer bands than into the harder wood bands, giving an undesirable texture and appearance to the panel. The depth gauge action minimizes this problem so that the depth of cut of any one tooth is substantially uniform. This is also true in the scarification of panels of other materials.

However, some variation of penetration of the various cutters into a panel face is desired to provide a texture to the surface of the panel. This differential depth of cutting of the cutters is effected by bending the base plates 284 of the cutters a slight amount from the true radius of the belt 40 on the pulleys 172, 174. This may be done simply by striking a plate 284 a light blow or two with a hammer which will vary its curvature sufficiently to effect a change of a few thousandths in the cutter penetration. Reducing the curvature of a plate 284 will permit the cutter bit thereon to form a deeper cut or groove since the cutter will project farther above the midpoint or crest of the base plate 284 than it did with the greater plate curvature. The crest of each base plate 284 thus acts as a depth gauge for the cutter carried thereby, and the height of the crest of the arcuate base plate from the chord subtending its ends determines the depth of cut thereof. That is, as each cutter assembly is moved across the bottom face of the panel being scarified, the gently rounded base plate engages the panel in advance of the cutting edge 292 thereof and limits the depth of cut of the cutting edge, and the more sharply curved the base plate is, the shallower is the cut effected by the cutting edge carried thereby. Conversely, the lesser the curve of the base plate, the greater is the distance that its cutting edge 292 projects above the crest of the base plate and the deeper is the groove formed thereby.

The rate of feed of the panels 24 through the apparatus may be varied to vary the pattern produced but a feed rate of about thirty feet per minute has been found suitable. As will be appreciated, if a panel were moved through the machine with its leading edge at right angles to its direction of movement, the grooves formed by the cutter bits 286 would be slightly canted because of the continued forward movement of a panel during the traverse of a tooth. Accordingly, if it is desired that the grooves formed in the panel face be parallel to an edge of a panel the panel is angled a slight amount, the amount of angle depending upon the rate of feed of the panel and the speed of the cutters, so that as the panel is fed across the cutters, a cutter starting a cut in a panel will be maintained a constant distance from the leading edge of the panel as it traverses the same. For this purpose an adjustable guide 296 is provided and against which an operator may position a panel to provide it with the correct angularity. Panels may also be provided with diagonal or other patterns and an additional adjustable guide 298 may be provided to help align panels for such purpose. The panels 24 shown in FIG. 1 are angled so as to form a diagonal pattern thereon and are shown in the position assumed by the panels after alignment on the guide 298.

*Operation*

To scarify the bottom surface of one of the panels 24 and provide a diagonally extending texture thereon, one end of the panel is positioned against the canted guide 298 (FIG. 1) to orient the panel and then the panel is pushed manually into the infeed rolls 26 and 28. The rolls 26 and 28 advance the panel over the gauge plate 104 and beneath roll 100 to the belt 40. The hold down rolls 100, 101 hold the panel against the gauge plates 104, 105 as the cutters 286 cut overlapping, shallow grooves in the face of the bottom of the panel. The overall depth of cut may be controlled by raising and lowering the supporting bar assembly 106.

Each portion of the bottom face of the panel travels from the belt 40 to and into engagement with the top face of the gauge plate 105 (FIG. 5) which top face is positioned above the level of the top face of the gauge plate 104 a distance substantially equal to the thickness of the material removed from the panel 24 by the cutters 286. In the case of redwood and Douglas fir a layer of approximately 0.020 inch is removed. The rolls 44, 46 feed the panels over the wire brush 220 which removes slivers and rough edges from the panel surface.

Different patterns can be formed on the panels by the above-described scarifying apparatus. For example, panels may be fed through the apparatus so that grooves are formed lengthwise, transversely or diagonally of the panel. By rerunning a panel through the machine at a different angle a crisscross pattern may be formed. By twisting the panel as it is fed through the apparatus a swirl pattern can be produced. As indicated previously, the apparatus of the invention may be utilized to scarify panels of various nature. Plywood and hardboard have been specifically mentioned, but it will be obvious that the apparatus may be utilized to scarify panels of any material which may be removed by the cutters 42, such as, for example, the so-called particle boards and chip boards.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In panel scarifying apparatus
 an endless, flexible belt,
 pulley means supporting said belt,
 means for driving said pulley means to move said belt in a predetermined direction,
 and a plurality of cutter elements mounted on said belt in longitudinally spaced relation,
 said elements each comprising a base plate bonded to one face of said belt,
 supporting bar means engaging the other face of said belt,
 and a plurality of cutter bits mounted one on each of said base plates on the trailing ends of said plates,
 said base plate being arched in the longitudinal direction with respect to said belt so that the crest thereof engages a panel in advance of the cutter bit associated therewith.

2. In panel scarifying apparatus
 an endless, flexible belt,
 a pair of pulleys supporting said belt,
 means for driving said pulley to move said belt in a predetermined direction,
 and a plurality of cutter elements mounted on said belt in longitudinally spaced relation,
 said elements each comprising a base plate bonded to the outer surface of said belt,
 said base plates being arched in the longitudinal direction with respect to said belt,
 and a plurality of cutter bits mounted one on each of said base plates on the trailing ends of said plates,
 said bits having a length substantially less than one-half the length of said plates and having a height with respect to the chord defined by the appropriate ends of said plate slightly greater than the height of the arc of said plate.

3. In panel scarifying apparatus
 an endless, flexible belt,
 a pair of pulleys of like diameter supporting said belt, means for driving said pulleys to move said belt in a predetermined direction,
and a plurality of cutter elements mounted on said belt in longitudinally spaced relation,
said elements each comprising a base plate bonded to the outer surface of said belt,
said base plates being arched in the longitudinal direction with respect to said belt,
the radius of curvature of said plates being substantially equal to the radius of curvature of said belt as it passes around said pulleys,
a plurality of cutter bits mounted one on each of said base plates on the trailing ends of said plates,
said bits having a length substantially less than one-half the length of said plates and having a height with respect to the chord defined by the appropriate ends of said plate slightly greater than the height of the arc of said plate,
said bits each comprising a body defined in part by a pair of side faces extending substantially normal to the corresponding base plate and lying in planes defining an acute angle with respect to each other, and being symmetrically disposed on opposite sides of the longitudinal axis of said base plate,
said body having a top surface substantially parallel to a plane tangential to the portion of the base plate at the mid point of said body,
the intersection of said top surface and said side faces defining a cutting point,
the intersection of said faces being provided with a slight radius so that said point is blunted.

4. In panel scarifying apparatus
an endless, flexible belt,
a pair of pulleys of like diameter supporting said belt,
means for driving said pulleys to move said belt in a predetermined direction,
and a cutter element mounted on said belt,
said element comprising a base plate bonded to the outer surface of said belt,
said base plate being arched in the longitudinal direction with respect to said belt,
the radius of curvature of said plate being substantially equal to the radius of curvature of said belt as it passes around said pulleys,
a cutter bit mounted on said base plate on the trailing end of said plate,
said bit having a length substantially less than one-half the length of said plate and having a height with respect to the chord defined by the appropriate ends of said plate slightly greater than the height of the arc of said plate,
said bit comprising a bare portion defined in part by a pair of side faces extending substantially normal to the base plate and lying in planes defining an acute angle with respect to each other, and being symmetrically disposed on opposite sides of the longitudinal axis of said base plate,
said bit having an integral, longitudinally extending, parallel sided, rib upstanding from a plane,
said base portion and offset from the center line thereof, the top surface of said rib being substantially parallel to a plane tangential to the base plate at the midpoint of said base portion,
the intersection of said side face and a side surface of said rib defining a cutting edge.

5. The panel scarifying apparatus of claim 4 and including
supporting bar means for supporting said one course of the belt and including facing means of low friction material engaging the belt.

6. The panel scarifying apparatus of claim 5 wherein the supporting bar means includes
an edge facing engaging one edge of the belt,
and a bottom facing engaging the inner face of the belt.

7. In a panel scarifying apparatus,
an endless belt,
cutter elements mounted on the endless belt,
a tubular beam,
a drive pulley,
means mounted on the beam mounting the drive pulley rotatably in a position drivingly engaging the endless belt,
means for rotating the drive pulley,
a slide mounted movably on the beam,
means for adjusting the slide relative to the beam,
an idler pulley,
and means mounting the idler pulley rotatably on the slide in a position in engagement with the endless belt.

8. In a panel scarifying apparatus,
an elongated guideway extending horizontally and open at the top,
an endless cutter means,
bar means extending along the guideway and movable vertically relative to the guideway for supporting a course of the endless cutter means,
a plurality of cams engaging and spaced along the bar means,
and means for moving the cams in synchronism to adjust the bar means in the guideway.

9. In a panel scarifying apparatus,
means for continuously advancing a panel along a predetermined horizontal path at a predetermined speed and in a predetermined plane,
an endless belt,
means mounting said endless belt adjacent said plane for movement of one course of said belt at one side of said plane and generally transversely of said predetermined direction,
means for advancing said belt continuously at a predetermined rate of speed,
and a plurality of cutters mounted on said belt therealong for engaging one face of said panel and cutting grooves in said panel and spaced sufficiently far from each other relative to said rates of speed that said grooves are distinctly separate from each other.

References Cited by the Examiner
UNITED STATES PATENTS

| | | | |
|---|---|---|---|
| 534,173 | 2/1895 | Pugh | 144—247 |
| 750,294 | 1/1903 | Matthiesen | 144—123 |
| 2,876,811 | 6/1953 | Matthews | 144—162 |
| 3,093,170 | 6/1963 | Thayer | 144—123 |

WILLIAM W. DYER, JR., Primary Examiner.

R. J. ZLOTNIK, Assistant Examiner.